United States Patent
Webb et al.

(10) Patent No.: US 6,285,397 B1
(45) Date of Patent: Sep. 4, 2001

(54) ALIGNMENT OF CATHODE RAY TUBE VIDEO DISPLAYS USING A HOST COMPUTER PROCESSOR

(75) Inventors: James R. Webb, Boulder; Ron C. Simpson, Erie, both of CO (US)

(73) Assignee: Display Laboratories, Inc., Kamuela, HI (US)

( * ) Notice: Subject to any disclaimer, the term of this patent is extended or adjusted under 35 U.S.C. 154(b) by 0 days.

(21) Appl. No.: 08/986,257

(22) Filed: Dec. 5, 1997

Related U.S. Application Data

(63) Continuation of application No. 08/907,682, filed on Aug. 8, 1997.
(60) Provisional application No. 60/035,392, filed on Jan. 16, 1997.

(51) Int. Cl.[7] .......................... H04N 17/00; H04N 17/02; H04N 3/26; G09G 1/04
(52) U.S. Cl. .......................... 348/189; 348/189; 348/190; 348/191; 348/745; 315/370; 315/371; 345/904
(58) Field of Search .................................. 348/189, 190, 348/191, 181, 745, 746, 747, 806, 807; 315/370, 371; 345/904

(56) References Cited

U.S. PATENT DOCUMENTS

| 3,702,949 | 11/1972 | Kolb . |
| 3,814,981 | 6/1974 | Rusk . |

(List continued on next page.)

FOREIGN PATENT DOCUMENTS

| 0 404 700 A1 | 12/1990 | (EP) . |
| 0 448 267 A2 | 9/1991 | (EP) . |
| 61-257096 | 11/1986 | (JP) . |
| 1-204594 | 8/1989 | (JP) . |
| 1-204595 | 8/1989 | (JP) . |
| 3-99376 | 4/1991 | (JP) . |
| 06303624 A | 10/1994 | (JP) . |
| 08088860 A | 4/1996 | (JP) . |
| 08182013 A | 7/1996 | (JP) . |

Primary Examiner—Reinhard J. Eisenzopf
Assistant Examiner—Paulos Natnael
(74) Attorney, Agent, or Firm—Merchant & Gould P.C.

(57) ABSTRACT

A system for automatically aligning video images on display devices such as cathode ray tube (CRT) monitors that use the processor and memory of a host computer to implement the alignment process. The system uses a host computer processor and previously generated correction factor data, representative of specific display distortion characteristics, to produce driver signals necessary to affect the alignment of video images on a CRT screen. The previously stored correction factor data may be retrieved from a characterization module within the display device or from any other convenient storage location. The correction factor data is processed by the host computer to produce correction control data which is transmitted, over a bi-directional serial connector, or a video connector, to the display device where the data is read by correction and driver circuitry. The specialized correction and driver circuitry set static decoders to generate the required correction signal for each distortion parameter at each location of the display screen. Correction factor data for dynamic distortion parameters may be stored in monitor memory where the data is used by waveform generators to produce dynamic correction signals. The plurality of correction signals are integrated, filtered, and summed by the CRT correction and driver circuitry before being applied to the CRT control circuits to align the video image. The present invention allows new correction signals to be quickly calculated by the host computer and applied to the CRT whenever a display parameter, such as resolution, frequency, color depth, etc. is changed. The host processor may generate the new data by using a gain matrix table, or interpolation techniques, as well as employing standard transformation equations.

4 Claims, 5 Drawing Sheets

U.S. PATENT DOCUMENTS

| | | |
|---|---|---|
| 3,944,884 | 3/1976 | Wilocki . |
| 3,961,223 | 6/1976 | Ray et al. . |
| 3,995,269 | 11/1976 | Schumacher . |
| 4,058,826 | 11/1977 | Schneider . |
| 4,139,799 | 2/1979 | Kureha et al. . |
| 4,201,932 | 5/1980 | Smith . |
| 4,281,340 | 7/1981 | Mitamura et al. . |
| 4,314,179 | 2/1982 | Tooyama et al. . |
| 4,385,259 | 5/1983 | Chase et al. . |
| 4,409,523 | 10/1983 | Yasumura . |
| 4,501,995 | 2/1985 | Olmstead et al. . |
| 4,506,292 | 3/1985 | Newton et al. . |
| 4,518,898 | 5/1985 | Tarnowski et al. . |
| 4,523,188 | 6/1985 | Huber . |
| 4,547,708 | 10/1985 | Haferl . |
| 4,549,117 | 10/1985 | Takahashi et al. . |
| 4,551,657 | 11/1985 | Miller et al. . |
| 4,555,649 | 11/1985 | Sharma . |
| 4,588,929 | 5/1986 | Wedam et al. . |
| 4,612,482 | 9/1986 | Beamon, III et al. . |
| 4,617,495 | 10/1986 | Culter . |
| 4,620,136 | 10/1986 | Bolger . |
| 4,625,154 | 11/1986 | Willis . |
| 4,631,576 | 12/1986 | St. John . |
| 4,634,937 | 1/1987 | Halferl . |
| 4,641,062 | 2/1987 | Pons . |
| 4,649,324 | 3/1987 | Guerra et al. . |
| 4,649,421 | 3/1987 | Kodama et al. . |
| 4,654,706 | 3/1987 | Davidson et al. . |
| 4,672,275 | 6/1987 | Ando . |
| 4,695,772 | 9/1987 | Lau et al. . |
| 4,754,204 | 6/1988 | Ando et al. . |
| 4,757,239 * | 7/1988 | Starkey, IV .......................... 315/371 |
| 4,764,709 | 8/1988 | Oliver . |
| 4,766,354 | 8/1988 | Oliver . |
| 4,772,948 | 9/1988 | Irvin . |
| 4,777,411 | 10/1988 | O'Connor et al. . |
| 4,789,811 | 12/1988 | Hulshof . |
| 4,795,946 | 1/1989 | Nishiyama . |
| 4,799,000 | 1/1989 | Close . |
| 4,810,939 | 3/1989 | Watanabe et al. . |
| 4,816,908 | 3/1989 | Colineau et al. . |
| 4,817,038 | 3/1989 | Knoll et al. . |
| 4,818,919 | 4/1989 | Kobayashi et al. . |
| 4,857,998 | 8/1989 | Tsujihara et al. . |
| 4,859,915 | 8/1989 | Decraemer . |
| 4,872,060 | 10/1989 | Micic et al. . |
| 4,887,011 | 12/1989 | Haynie et al. . |
| 4,896,081 | 1/1990 | Ichigaya et al. . |
| 4,896,082 | 1/1990 | Geiger . |
| 4,897,721 | 1/1990 | Young et al. . |
| 4,952,851 | 8/1990 | Macaulay . |
| 4,963,828 | 10/1990 | Kawame et al. . |
| 4,989,072 | 1/1991 | Sato et al. . |
| 5,020,116 | 5/1991 | Macaulay . |
| 5,034,667 | 7/1991 | Lendaro . |
| 5,036,251 | 7/1991 | Lee . |
| 5,059,979 | 10/1991 | Micic et al. . |
| 5,081,523 | 1/1992 | Frazier . |
| 5,111,110 | 5/1992 | Houben . |
| 5,113,122 | 5/1992 | Bando et al. . |
| 5,115,171 | 5/1992 | Haferl . |
| 5,155,417 | 10/1992 | Tateishi . |
| 5,159,436 | 10/1992 | Soneira . |
| 5,164,639 | 11/1992 | Shimaoka et al. . |
| 5,194,784 | 3/1993 | Tripod . |
| 5,214,499 | 5/1993 | Gleim et al. . |
| 5,216,504 * | 6/1993 | Webb et al. ......................... 358/139 |
| 5,220,251 | 6/1993 | Gawell et al. . |
| 5,231,481 | 7/1993 | Eouzan et al. . |
| 5,237,246 | 8/1993 | Gleim et al. . |
| 5,257,096 | 10/1993 | Oshima . |
| 5,260,628 | 11/1993 | Kawaberi et al. . |
| 5,276,458 | 1/1994 | Sawdon . |
| 5,294,866 | 3/1994 | Miyazaki et al. . |
| 5,325,195 * | 6/1994 | Ellis et al. .......................... 348/180 |
| 5,345,262 | 9/1994 | Yee et al. . |
| 5,355,058 | 10/1994 | Jackson et al. . |
| 5,369,499 | 11/1994 | Yip . |
| 5,398,083 | 3/1995 | Tsujihara et al. . |
| 5,399,945 | 3/1995 | Haferl . |
| 5,402,044 | 3/1995 | Haferl . |
| 5,420,483 | 5/1995 | Suzuki et al. . |
| 5,420,645 | 5/1995 | Traa et al. . |
| 5,432,548 | 7/1995 | Byen et al. . |
| 5,434,483 | 7/1995 | Yang et al. . |
| 5,434,484 | 7/1995 | Murakami . |
| 5,434,595 | 7/1995 | Macaulay . |
| 5,436,677 | 7/1995 | Suzuki et al. . |
| 5,440,340 | 8/1995 | Tsurutani et al. . |
| 5,463,427 | 10/1995 | Kawashima . |
| 5,473,394 * | 12/1995 | Hideyuki ............................. 348/807 |
| 5,499,040 | 3/1996 | McLaughlin et al. . |
| 5,504,521 | 4/1996 | Webb et al. . |
| 5,506,481 | 4/1996 | Wada et al. . |
| 5,510,833 | 4/1996 | Webb et al. . |
| 5,512,964 | 4/1996 | Kim . |
| 5,528,112 | 6/1996 | George et al. . |
| 5,532,764 | 7/1996 | Itaki . |
| 5,537,159 | 7/1996 | Suematsu et al. . |
| 5,565,897 * | 10/1996 | Kikinis et al. ....................... 348/904 |
| 5,570,108 * | 10/1996 | McLaughlin et al. ............... 345/146 |
| 5,592,240 | 1/1997 | Sakamoto et al. . |
| 5,644,757 * | 7/1997 | Lee ....................................... 395/501 |
| 5,657,079 * | 8/1997 | Thario et al. ........................ 348/190 |
| 5,677,732 * | 10/1997 | Moon .................................. 348/190 |
| 5,801,767 * | 10/1998 | Wu ...................................... 348/190 |
| 5,926,211 * | 7/1999 | Nakayabu ............................ 348/190 |
| 5,969,756 * | 10/1999 | Buckley et al. ..................... 348/190 |
| 6,014,168 * | 1/2000 | Webb et al. ......................... 348/190 |

\* cited by examiner

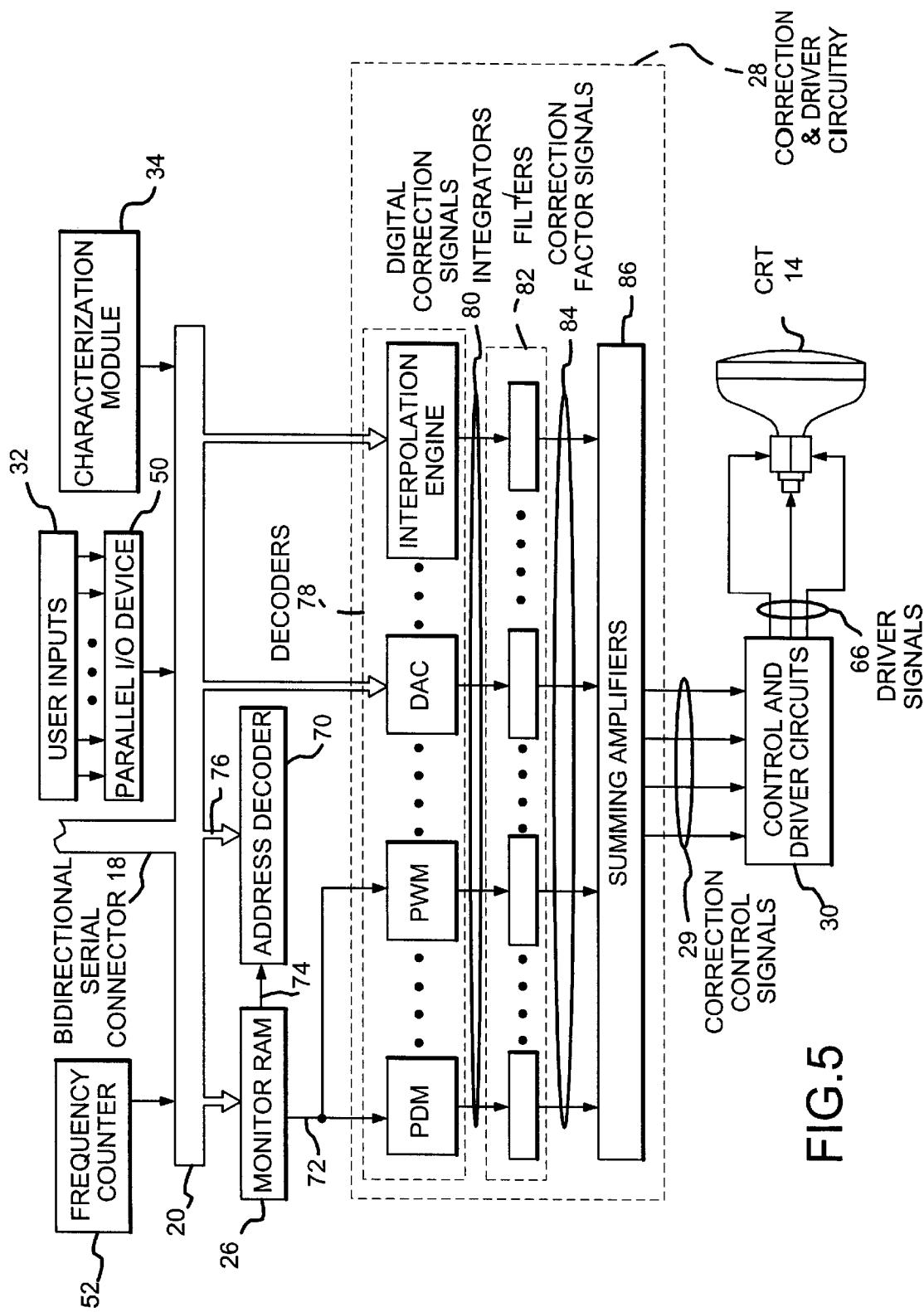

US 6,285,397 B1

ALIGNMENT OF CATHODE RAY TUBE VIDEO DISPLAYS USING A HOST COMPUTER PROCESSOR

REFERENCE TO RELATED APPLICATIONS

This is a continuation of U.S. patent application Ser. No. 08/907,682 filed Aug. 8, 1997, entitled "Alignment of Cathode Ray Tube Video Displays Using a Host Computer Processor", and based upon Provisional Application No. 60/035,392 filed Jan. 16, 1997, entitled "Alignment of Cathode Ray Tube Video Displays Using a Host Computer Processor".

BACKGROUND OF THE INVENTION

A. Field of Invention

This invention pertains generally to cathode ray tube (CRT) alignment and more particularly to the use of processor and memory within a host computer to store, process, and transfer necessary correction factor data to align video displays on CRT devices.

B. Definitions

Align means to cause a video image to be adjusted so that distortion characteristics are reduced and the video image that is displayed on a display forms an image that is pleasing to the eye.

Bi-directional connector means any electrical, optical, electromagnetic or other type of connection that is capable of transmitting information in at least two directions, either on a separate cable or other link, the same cable or link, during horizontal or vertical retrace, or during trace if over a separate cable or link.

Cathode ray tube monitor means a cathode ray tube and one or more of the following: associated circuitry, windings, coils, electron guns and other similar devices.

Characterization module means a device that includes storage such as non-volatile memory for storing correction factor data or an identification number for the display. The characterization module can also store term multipliers or parametric data for use in aligning a display that employs standard transformation equations.

Connector means any electrical, optical, electromagnetic or other type of device or system for making a connection.

Correction and driver circuitry means one or more of the following: digital to analog converters, interpolation engine, pulse width modulators and pulse density modulators, as well as summing amplifiers, oscillators, op-amps, inverters comparators and/or any other components necessary to generate correction signals.

Correction control data means correction factor data that has been processed for a particular set of monitor settings and/or a particular location of a video image on a display screen.

Correction factor data comprises encoded digital bytes or any other form of data or signal that is representative of the distortion characteristics of a display for one or more correction factor parameters. Correction factor data may include data from a vision system, a gain matrix table, and/or manually generated data relating to geometry or distribution characteristics, as well as other correction factor parameters of the display. Correction factor data may take the form of term multipliers or parametric data that is used to adjust standardized transformation equations.

Correction factor parameters include various geometry characteristics of a display including horizontal size, raster rotation, vertical size, horizontal center, vertical center, pincushioning, vertical linearity, keystoning, convergence, etc, and various electron gun characteristics including contrast, brightness, luminosity, focus, color balance, color temperature, electron gun cutoff, etc.

Correction signals means any of the signals generated by the correction and driver circuitry, and/or the control and driver circuits, correction factor data and correction control data.

Decoder means a device for generating, transforming or modifying a signal or other data in response to one or more input signals including data inputs. For example, a decoder may be a pulse width modulator, a pulse density modulator, a digital to analog converter, an interpolation engine, a lookup table, a processor, etc.

Display means a device or system for viewing a video image that includes cathode ray tube monitors.

Disposed in means physically placed in association with another device.

Distortion characteristics means the amount of any particular type of distortion as indicated by the distortion data measured at a number of different points on a display.

Distortion data means a signal or other data that is representative of the distortion characteristics that exist on a display with regard to the geometry characteristics of the display, and/or electron gun characteristics of the display. For example, distortion data can be measured as a result of misalignment of a video image or improper amplitude or gain of a video signal.

Electronic storage medium means an electronically operated device or component that is capable of storing information.

Filters means any type of signal conditioner including integrators.

Host computer means any apparatus having a processor that is used in conjunction with a display, including computers, television receivers, set top boxes, etc.

Host processor means a device capable of processing data that is not disposed in a display.

Integrators means a type of signal conditioner that performs a time integration of an input signal.

Located externally to means placed physically outside of another device.

Magnetic storage medium means a device that is capable of storing information using a magnetic medium.

Memory comprises any desired storage medium including, but not limited to, EEPROMS, RAM, EPROMs, ROMs, magnetic storage, magnetic floppies, bar codes, serial EEPROMs, flash memory, optical storage magneto-optical storage, DVD, etc., or any improvements of these types of storage or other types of storage.

Monitor RAM means any type of storage or memory.

Optical storage medium means a device that is capable of storing information using an optical medium.

Processor means a logic device including, but not limited to, state machines, micro-processors, digital signal processors, etc.

Serial connector means a connector that is capable of transmitting data serially.

Set top box means a host computer used in conjunction with a television receiver.

Storage means any type of storage device or memory for storing data including magnetic storage media such as floppy disks, optical storage media, non-volatile memory, magneto-optical storage, devices, compact disks, etc.

Summing amplifiers means devices that are capable of combining a plurality of input signals such as disclosed in U.S. patent application Ser. No. 08/611,098 filed Mar. 5, 1996 by James R. Webb et al. entitled "Method and apparatus for Making Corrections in a Video Monitor".

Television receiver means a device that receives either a digital or analog television signal and transforms the television signal into a video signal for display on a cathode ray tube monitor.

Video image means a displayed image that appears on a display screen that is produced in response to a video signal.

Video signal means an electronic signal that is representative of video image data.

C. Description of the Background

Recent developments in the automated measurement of display device distortion parameters such as cathode ray tubes and the automated alignment of CRT displays, in devices such as computer monitors and digital television sets, have made it possible to correct video displays for numerous types of distortion. Presently, these corrections are performed within the CRT device by an advanced digital monitor board using a dedicated processor and memory. As the ability to correct for various types of video distortions has increased, the memory size and processor speed required to automate video image alignment has become more expensive and has increased the cost of CRT devices using these systems. These costs have effectively limited the use of automatic alignment techniques to only the most expensive CRT devices. This has prevented use of dynamic alignment techniques in the majority of CRT monitors manufactured today. Therefore, it would be desirable to implement automatic distortion correction without a dedicated processor in the monitor and to minimize the memory required within the monitor or CRT device. Such new implementations would allow automated distortion correction to be extended to the large number of low cost CRT devices not presently using these techniques. It is against this background and these problems and limitations that the present invention has been developed.

SUMMARY OF THE INVENTION

The present invention overcomes the disadvantages and limitations of the prior art by providing an apparatus and method for using a host computer processor and memory to generate correction control data for transmission over a bi-directional serial connection to a monitor RAM. The correction control data is read by appropriate decoders to automatically align video images on a CRT device.

The present invention may therefore comprise an apparatus for using correction factor data, representative of distortion characteristics of a display device, to align video images on the display device comprising a host computer having a host processor that generates correction control data from the correction factor data, a connector disposed between the host computer and the display device that transmits the correction control data from the host computer to the display device, and correction and driver circuitry coupled to the connector to receive the correction control data to generate signals to align the video images on the display device.

The present invention may also comprise a method of using a host processor disposed in a host computer to generate correction control data for aligning video images on a cathode ray tube monitor from correction factor data stored in the cathode ray tube monitor comprising the steps of, transmitting the correction factor data from the cathode ray tube monitor to the host computer over a connector disposed between the cathode ray tube monitor and the host computer, processing the correction control data using the host processor to generate the correction control data, transmitting the correction control data from the host processor to the cathode ray tube monitor through the connector, and using the correction control data to align the video images on the cathode ray tube monitor.

The present invention may also comprise a system for aligning video images on a display device comprising, a host processor located externally to the display device that processes correction factor data to generate correction control data, a bi-directional connector disposed between the host processor and the display device that transmits correction factor data stored with the display device to the host processor, and a video connector coupled to the host processor and the display device that transmits the correction control data from the host processor to the display device.

The present invention may also comprise a system for transmitting correction signals for aligning video images on a display device comprising, a host processor located externally to the display device, and a bi-directional connector coupled to the host processor and the display device that transmits correction factor data from the display device to the host processor and correction control data from the host processor to the display device.

The present invention overcomes the disadvantages and limitations of the prior art by providing an apparatus and method for producing an aligned video image on a display device by using the processor and memory of a host computer to process and transmit correction factor data representative of the distortion characteristics of the display device over one or more connectors that exist between the display device and the host computer. Any desired number of individual correction factor parameters, both static and dynamic, may be applied by the method of this invention to produce the desired aligned, low distortion, video image. Unlike prior methods of automated distortion correction, the present invention employs the processor and memory of the host computer and thus requires minimal memory and no processor within the monitor. The present invention extends the benefits of automated distortion correction to a new class of lower priced CRT devices.

BRIEF DESCRIPTION OF THE DRAWINGS

FIG. 5 is an expanded block diagram illustrating the decoder circuitry.

DETAILED DESCRIPTION OF THE PREFERRED EMBODIMENT OF THE INVENTION

Figure 1:
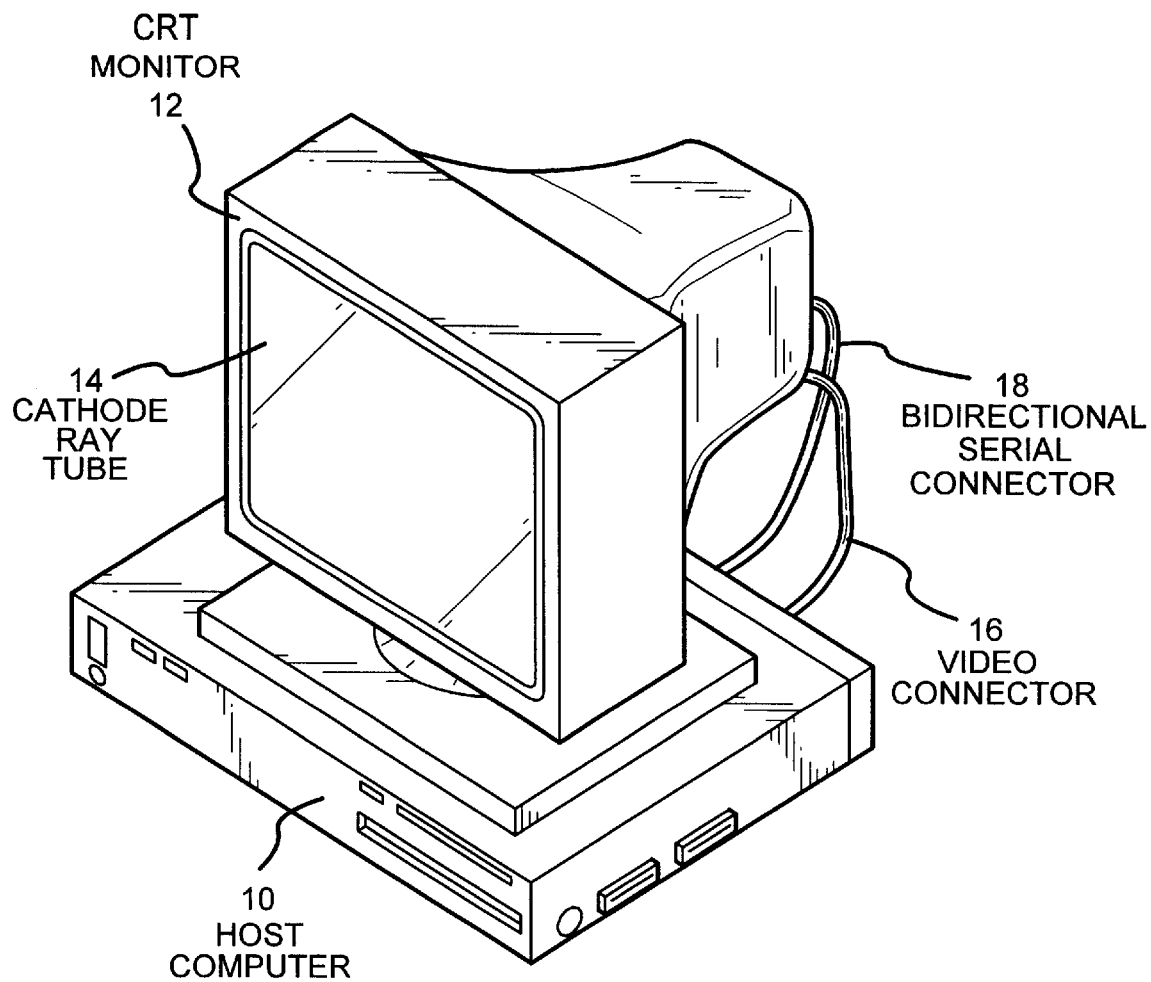
FIG. 1 is a schematic illustration of a host computer and an associated cathode ray tube monitor and the connections therebetween.

FIG. 1 discloses a host computer 10 and a monitor 12, and associated cathode ray tube (CRT) 14 that are connected by video connector 16 and bi-directional serial connector 18. Numerous and complex interrelationships exist between the various horizontal and vertical correction factor parameters (scan geometries) in cathode ray tube image displays, and these relationships can be measured and characterized by correction factor data to automate CRT video image alignment. Correction factor data can be derived as disclosed in U.S. Pat. No. 5,216,204 issued to James R. Webb et al. entitled "Automatic Precision Video Alignment System" that describes the use of a vision system to measure CRT distortion characteristics and also by the interpolation engine disclosed in U.S. patent application Ser. No. 08/613,902 filed Mar. 11, 1996 entitled "Interpolation Engine for Generating Font Gradients" that can be used to generate additional data points falling between the measured correction data points, thus generating additional correction factor data. This patent and patent application are specifically incorporated herein by reference for all that they disclose and teach.

When distortion data is obtained with a vision system, derived from a gain matrix table or generated by an interpolation engine, it may be stored as correction factor data in a characterization module within the CRT device or in any other convenient storage medium for later retrieval and use. This correction factor data may then be used by the CRT device circuitry to generate and apply driver signals as disclosed in U.S. patent applications Ser. No. 08/638,222 filed Apr. 26, 1996 by James R. Webb et al. entitled "Screen Mapping of a Cathode Ray Tube" and Ser. No. 08/611,098 filed Mar. 5, 1996 by James R. Webb et al. entitled "Method and Apparatus for Making Corrections in a Video Monitor" that are specifically incorporated herein for all that they disclose and teach. As disclosed herein, the same correction factor data can be retrieved from the characterization module in the cathode ray tube monitor 12, transmitted over bi-directional serial connector 18 to the host computer 10, processed in the host computer 10, and transmitted back to monitor 12 over bi-directional serial connector 18. This eliminates the need for a dedicated processor in monitor 12 and reduces the memory required within the CRT monitor 12.

Figure 2:
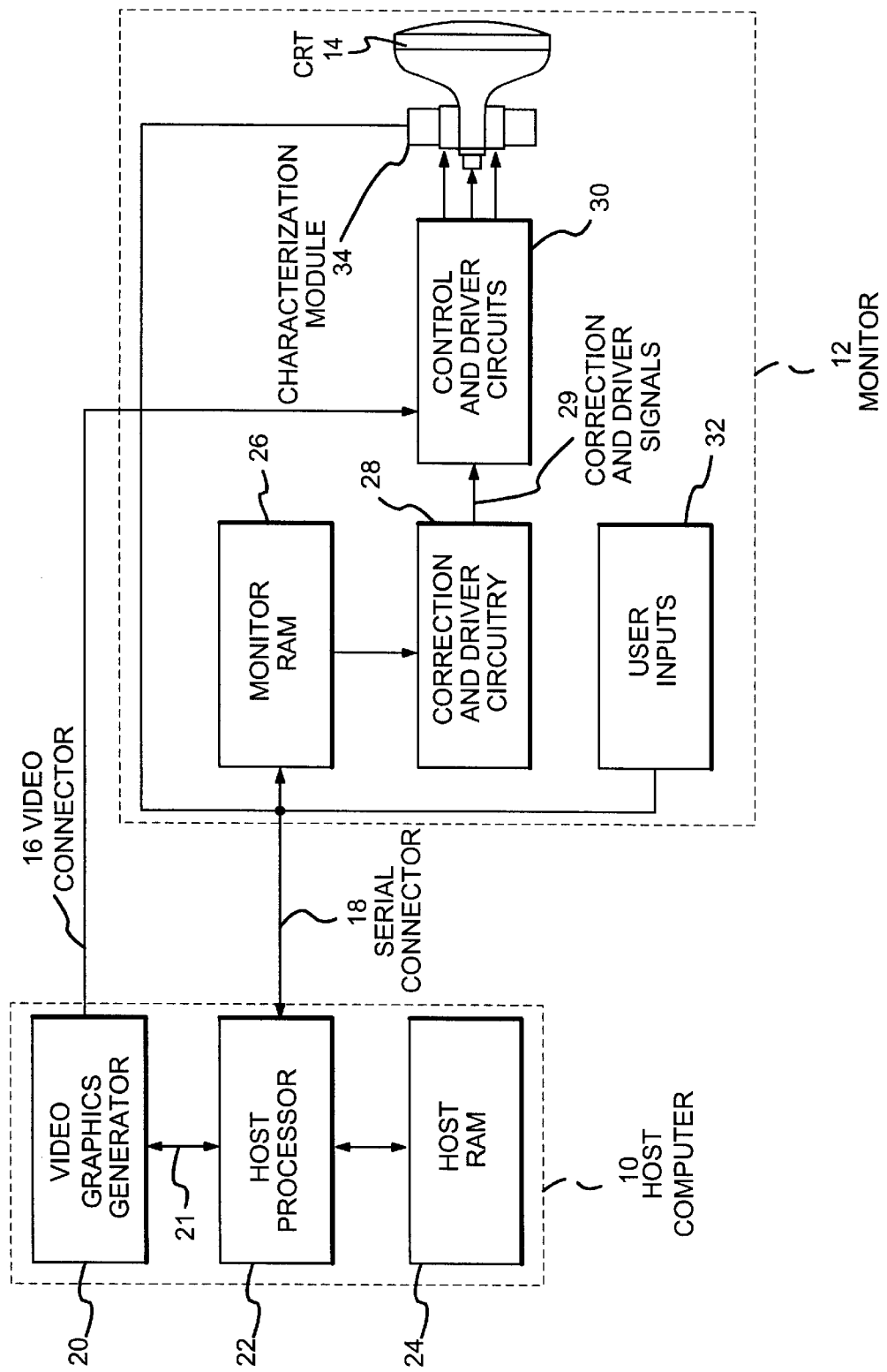
FIG. 2 is a block diagram of one embodiment of the present invention.

FIG. 2 is a schematic block diagram illustrating the primary components of one embodiment of the present invention. As shown, host computer 10 includes a host processor 22 that is connected to a host RAM 24 and a video graphics generator 20. Host processor 22 processes the various data and stores data in the large host RAM 24. For example, correction control data is generated from correction factor data and stored in host RAM 24. Video graphics generator 20 comprises a standard video graphics generator that is used to drive a display. Video graphics generator 20 includes a RAM that stores the image data to be displayed on monitor 12. Host processor 22 generates the video data and transmits the video data via bi-directional connector 21 to the RAM in video graphics generator 20.

Host processor 22 is also connected to a bi-directional serial connector 18 as described above. Serial connector 18 can comprise any one of the standard format serial connectors that are presently becoming more commonly used, including $I_2C$, DDC and USB. These devices function in a fashion similar to a serial bus in that some support multiple and/or different peripheral devices.

The video data generated and stored in video graphics generator 20 is transmitted to the control and driver circuits 30 in monitor 12 via a video connector 16. Video connector 16 comprises a standard video connector that is used to transmit data from host computer 10 to monitor 12. The control and driver circuits 30 generate the video signals that are applied to cathode ray tube 14 to produce a video image.

Serial connector 18 is connected to monitor RAM 26, user inputs 32 and characterization module 34, which are all disposed within the monitor 12. Characterization module 34 contains the correction factor data that comprises the encoded digital bytes or other forms of data that is representative of the distortion characteristics of the cathode ray tube at a plurality of correction factor addresses. The correction factor data may be generated by a vision system such as described in the above-referenced U.S. patent application Ser. No. 08/638,222 filed Apr. 26, 1996 entitled "Screen Mapping of a Cathode Ray Tube". Additionally, the correction factor data can be manually generated. Correction factor data may be in the form of term multipliers or parametric data that is used to adjust standardized transformation equations that are representative of the amount of correction needed to align a video image on a cathode ray tube to counteract various distortion characteristics. Alternatively, the correction factor data can comprise data that is simply representative of the distortion characteristics at a particular location on a screen.

The correction factor data that is stored in the characterization module 34 is read by the host processor through serial connector 18 or alternatively through the video connector 16. Also, the serial connector 18 and video connector 16 can comprise one cable or separate cables. The host processor 22 can then generate more detailed correction control data that is stored in host RAM 24. Host processor 22 is normally sufficiently powerful to generate the correction control data in a fairly rapid manner. In addition, host RAM 24 is sufficiently large to hold the full complement of correction control data without significantly affecting the storage capabilities of host RAM 24. The correction factor data stored in the characterization module 34 can be read and processed to generate the correction control data during times when host processor 22 is inactive, during boot-up, etc.

Once the correction control data has been fully generated from the correction factor data and stored in host RAM 24, host processor 22 transfers the correction control data to monitor RAM 26 for storage via serial connector 18. Monitor RAM 26 has sufficient capacity to store the full amount of the correction control data. The correction and driver circuitry 28 reads the correction control data stored in monitor RAM 26 at the appropriate times to generate the correction control signals that are transmitted via connector 29 to the control and driver circuits 30. The correction control signals 29 comprise signals that are representative of the correction necessary to minimize or eliminate distortion in the video image. The correction control signals are applied to the control and driver circuits 30 that generate the video image. User inputs 32 are also connected to the serial connector 18. User inputs 32 may comprise the standard buttons that are located on the monitor 12 that allow the user to adjust various correction factor parameters such as horizontal center, vertical center, horizontal size, vertical size, keystoning, brightness, luminosity, color balance, etc. In addition, user inputs may be available on the monitor 12 or within the host computer 10 to change the vertical or horizontal frequency of the displayed image or other features.

Host processor 22 periodically scans the user inputs 32 to determine if a change has taken place. If so, host processor 22 will generate a new set of correction control data from the correction factor data that is stored in characterization module 34 and store the new correction control data in host RAM 24. The new correction control data stored in host RAM 24 will then be transmitted to monitor RAM 26 in the manner described above. So, for example, if the vertical center of the image is moved by the user through the user inputs 32, an entire new set of correction control data will be generated by the host processor 22 to provide a correctly aligned video image for the new location of the video image on CRT 14.

Figure 3:
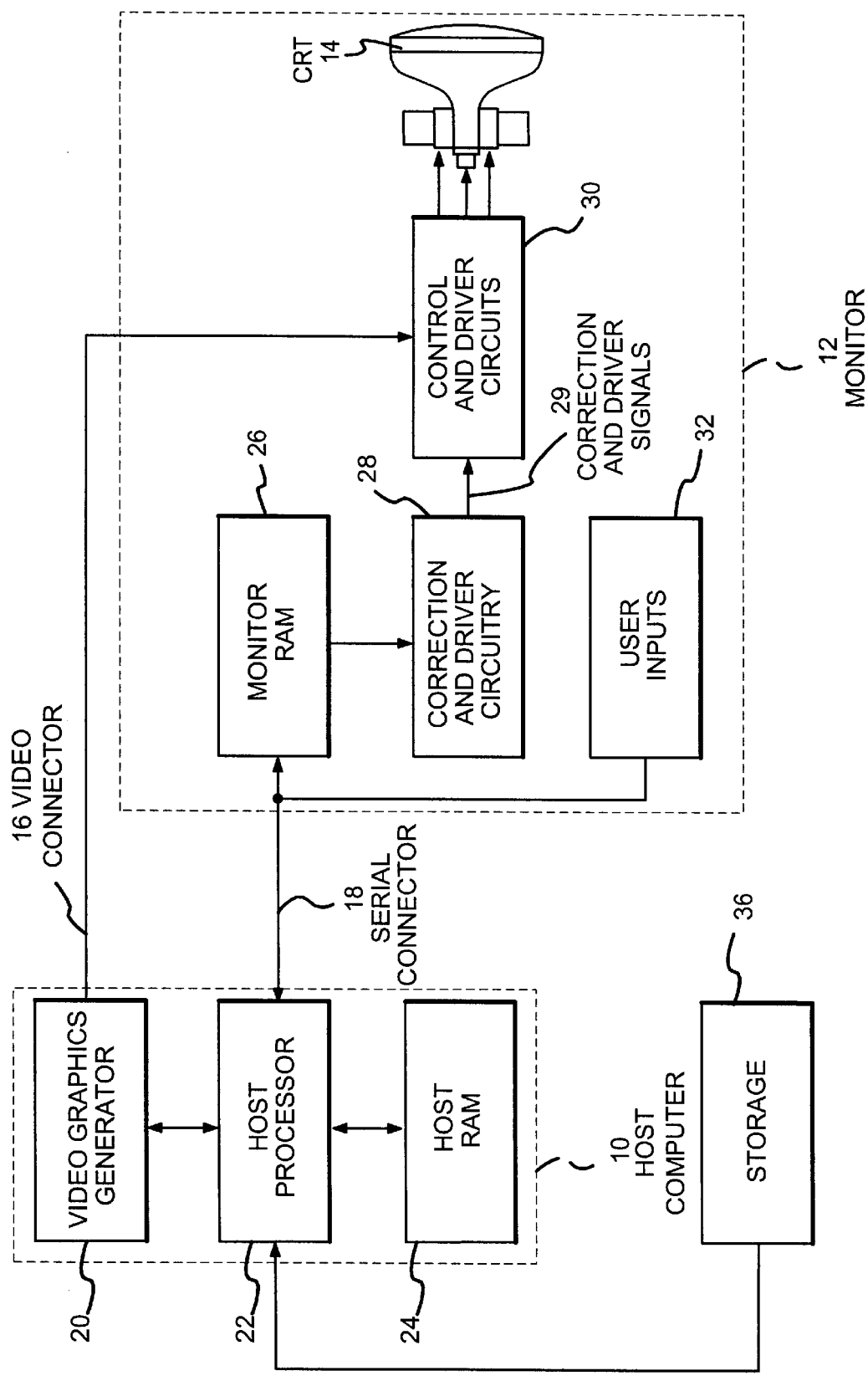
FIG. 3 is a block diagram of another embodiment of the present invention.

FIG. 3 discloses another embodiment of the present invention. FIG. 3 illustrates an architecture very similar to the architecture of FIG. 2. In the embodiment of FIG. 3, however, the correction factor data is stored in a storage device 36 rather than in the characterization module 34 of FIG. 2. Storage device 36 can comprise any one of a number of different devices or ways of storing the correction factor data such as disclosed in U.S. patent application Ser. No. 08/638,222 filed Apr. 26, 1996 entitled "Screen Mapping of a Cathode Ray Tube". For example, storage device 36 can comprise a floppy disk that accompanies the monitor 12 that contains the correction factor data for the monitor 12. Additionally, storage device 36 may comprise a hard disk within the host computer 10 that stores correction factor data that it has received from some external source. Similarly, storage device 36 may comprise any type of memory device, including magneto-optical disks, EPROMs, PROMs, ROMs, magnetic storage devices, optical storage devices, etc. Additionally, storage device 36 may comprise a portion of a network on which the correction factor data is stored.

The embodiment of FIG. 3 operates in a manner very similar to the embodiment of FIG. 2. Host processor 22 reads the correction factor data from storage 36 and generates correction control data that is stored in host RAM 24. Host processor 22 also generates video image data that is stored in video graphics generator 20. The video image data from video graphics generator 20 is transmitted to the control and driver circuits 30 via video connector 16.

The correction control data that has been processed and stored in host RAM 24 is then transmitted to monitor RAM 26 by host processor 22 through the serial connector 18. Monitor RAM 26 stores the correction control data that is read by correction and driver circuitry 28. Correction and driver circuitry 28 uses the correction control data to generate correction control signals 29 that are transmitted to control and driver circuits 30 to generate an aligned video image on CRT 14. Host processor 22 scans the user inputs 32 to determine if the user has made a change to any of the inputs 32. If a change has been made, host processor 22 generates a new set of correction control data and stores the correction control data in host RAM 24. Host processor 22 then transmits the correction control data stored in host RAM 24 to monitor RAM 26 so that an aligned image can be generated on CRT 14 for the new user inputs.

Figure 4:
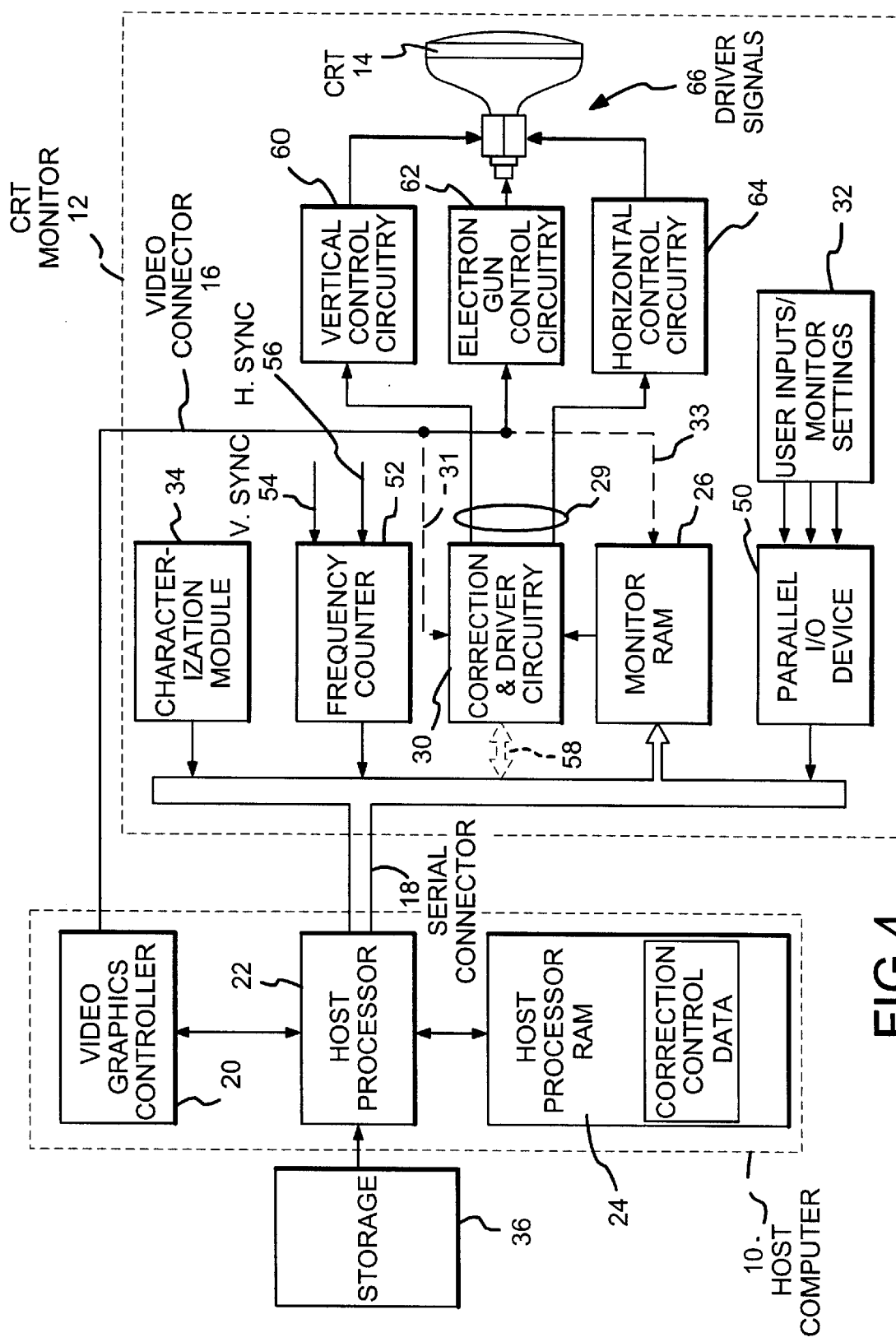
FIG. 4 is an expanded schematic block diagram of the present invention.

FIG. 4 is a more detailed schematic block diagram that combines features of the embodiments disclosed in FIGS. 2 and 3 and discloses additional features. As shown in FIG. 4, host processor 22 is coupled to a host processor RAM 24 and a video graphics controller 20. Correction factor data can be read from storage 36 or from the characterization module 34 via the serial connector 18. Each of these devices operates in the manner disclosed above. Additionally, monitor RAM 26 is also coupled to the serial connector 18, and stores the correction control data generated by host processor 22 in the manner disclosed above. The user input/monitor settings 32 are connected to a parallel I/O device 50 that allows a number of user inputs for monitor settings to be applied to a single serial port on the serial connector 18.

FIG. 4 also illustrates a frequency counter 52 that is coupled to the serial connector 18. Frequency counter 52 is coupled to a vertical sync input 54 and a horizontal sync input 56. Frequency counter 52 counts the frequency of the displayed image and provides that information to host processor 22. Host processor 22 determines if a change has occurred in the frequency of the displayed image and functions to recalculate a new set of correction control data when the frequency changes, in the same manner as when user inputs change. The advantage of having a frequency counter 52 is that the actual frequency of the displayed image can be scanned rather than relying upon user inputs or processing of a control input within the host computer 10 to determine if a change has taken place in the frequency of the displayed image. In this manner, actual frequency data can be obtained from the monitor.

FIG. 4 also illustrates an additional feature of the present invention. Connector 58 provides an optional connection directly from the correction and driver circuitry 30 to serial connector 18. In this manner, host processor 22 can provide correction control data directly to the correction and driver circuitry 30, via connector 58, rather than storing such information in monitor RAM 26. The speed of the serial connector 18 is normally not great enough to provide the correction control data on a real time basis to correction and driver circuitry 30. However, in order to reduce the size of the monitor RAM 26, it may be beneficial to provide certain static values of the correction control data directly to the correction and driver circuitry 30 via connector 58. Additionally, some parameters only change several times for the entire image, and serial connector 18 may provide that information on a real time basis. Also, only a few data points for the entire image may be required for an interpolation engine such as disclosed in U.S. patent application Ser. No. 08/1613,902 filed Mar. 11, 1996 entitled "Interpolation Engine for Generating Font Gradients". These few data points may also be provided by the serial connector 58 on a real time basis to the correction and driver circuitry 30. Furthermore, although current standards for serial connector 18 do not have a sufficient bandwidth to provide data on a real time basis, future formats may have sufficient bandwidth. For example, it may be desirable in the future to provide a standard Ethernet connection in place of serial connector 18. As the cost of Ethernet cards is reduced, a high speed Ethernet connection between host computer 10 and monitor 12 may be a practical alternative to the standard format serial connectors 18 that are now in use. In that case, monitor RAM 26 may be eliminated to further reduce the cost and complexity of the circuitry in CRT monitor 12.

FIG. 4 also illustrates another embodiment for transferring data between host computer 10 and CRT monitor 12. A serial connector can be used, in the manner described above, to transfer data from the characterization module 34 and/or user inputs/monitor settings 32 to host processor 22. Host processor 22 can then generate correction control data, as described above. Host processor 22 can then store the correction control data in the video RAM of video graphics controller 20 and transfer the correction control data to CRT monitor 12 from the video graphics controller 20 during the blanking time via the video connector 16 such as disclosed in U.S. patent application Ser. No. 60/038,771 filed on Jan. 16, 1997 by James R. Webb and Ron C. Simpson, entitled "Alignment of Cathode Ray Tube Displays Using a Video Graphics Controller," which is incorporated herein by reference for all that it discloses and teaches. The video connector 16, in this case, may be connected to connector 31 that allows correction control data generated by the host computer 22 to be transmitted directly to the correction and driver circuitry 30 and/or to connector 33 for storage in monitor RAM 26.

As also shown in FIG. 4, the correction and driver circuitry 30 generates three correction control signals 29 that are applied respectively to vertical control circuitry 60, electron gun control circuitry 62, and horizontal control circuitry 64. This circuitry generates driver signals 66 that are applied to the cathode ray tube 14.

FIG. 5 is a more detailed schematic block diagram illustrating details of the correction and driver circuitry 28. The correction factor data that is read by the host processor 22 from either the characterization module 34 or storage 36 contains data relating to the correction factor parameter that is being corrected for the particular location on the screen. From this information, the host processor generates correction control data that includes address information for directing the correction control data to the proper decoder within the correction and driver circuitry 28. Hence, the correction control data which includes address information is transmitted via bi-directional serial connector 18 from the host processor 22 to monitor RAM 26 as illustrated in FIG. 5. Monitor RAM 26 stores the correction control data, including the address information, as described above. As a video image is generated, monitor RAM 26 sequentially reads the correction control data on output 72 and corresponding address information on output 74. The address information on output 74 is coupled to an address decoder 70 that generates a series of enable signals that enable a particular decoder 78. The correction control data on output 72 is applied to each of the decoders 78. When a decoder 78 is enabled by an enable signal from address decoder 70, the enabled decoder reads the correction control data and generates a corresponding digital correction signal 80. Alternatively, each of the decoders 78 may have an address decoder that forms part of the I/O circuitry for the decoder 78. In that case, both address and data are provided on output 72 and a separate address decoder 70 is not required. The decoders can comprise pulse density modulators, pulse width modulators, DACs, or an interpolation engine, as illustrated in FIG. 5, depending upon the nature of the correction control data. Use of pulse width modulators is more fully disclosed in U.S. Pat. No. 5,216,504 issued Jun. 1, 1993 entitled "Automatic Precision Video Monitor Alignment System" which is hereby specifically incorporated herein by reference for all that it discloses and teaches. The use of pulse density modulators to make corrections is more fully disclosed in U.S. Pat. No. 5,504,521 issued Apr. 2, 1996 entitled "Method and Apparatus for Making Corrections in a Video Monitor During Horizontal Scan", as well as U.S. patent application Ser. No. 08/585,926 filed Jan. 16, 1996 entitled "Method and Apparatus for Making Corrections in a Video Monitor During Horizontal Scan" and U.S. patent application Ser. No. 08/611,098 filed Mar. 5, 1996 entitled "Method and Apparatus for Making Corrections in a Video Monitor", all of which are specifically incorporated herein by reference for all that they disclose and teach.

FIG. 5 also discloses that the decoders 78 can be directly accessed from the host processor 22 via the bi-directional serial connector 18. In this case, an address decoder 76 may receive address information from the serial connector 18 via connector 76. Address decoder 70 then enables the proper decoder within the series of decoders 78 to receive the correction control data. Alternatively, decoders 78 may have built-in address decoders so that a separate address decoder 70 is not required. Each of these different alternatives depends upon the protocol of the particular serial connector 18.

FIG. 5 also illustrates the other devices that may be connected to the bi-directional serial connector 18 in the CRT monitor 12. For example, FIG. illustrates a frequency counter 52, user inputs 32, parallel I/O device 50 and characterization module 34 connected to the bi-directional serial connector 18.

As also illustrated in FIG. 5, once the digital correction signals 80 are produced by the decoders 78, these signals are applied to integrators/filters 82 to produce correction factor signals 84. Correction factor signals 84 are applied to summing amplifiers 86 that generate the correction control signals 29. This process is more fully disclosed in the above-referenced patents and applications. The correction control signals are applied to the control and driver circuits 30 that generate driver signals 66. Driver signals 66 are applied to the CRT 14 to produce an aligned video image.

Hence, FIGS. 1 through 5 illustrate that correction factor data may be processed in a host computer 10 and transmitted to a CRT device 12 over a bi-directional serial connector 18 for use in CRT device circuitry for the alignment of the video images on the cathode ray tube 14.

The present invention therefore provides a novel and unique method and apparatus for using a host computer to process correction factor data, store, and transmit correction control data over a serial connection and/or a video connector for use in the alignment of video images. The necessary correction factor data can either be generated with a vision system, or gain matrix table, or manually generated by a technician using analog adjustments to monitor board circuitry. All that is necessary is that correction factor data, representative of the CRT distortion characteristics, be stored and available to the host computer. Unlike prior methods of automated distortion correction, the present invention allows the use of a host computer processor and memory, thus eliminating the need for a dedicated processor and reducing the memory required in the CRT device.

The foregoing description of the invention has been presented for purposes of illustration and description. It is not intended to be exhaustive or to limit the invention to the precise form disclosed, and other modifications may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A method of using a host processor disposed in a host computer to generate correction control data for aligning video images on a cathode ray tube monitor from correction factor data stored in said cathode ray tube monitor comprising the steps of:

transmitting said correction factor data from said cathode ray tube monitor to said host computer over a connector disposed between said cathode ray tube monitor and said host computer;

processing said correction factor data using said host processor to generate said correction control data;

transmitting said correction control data from said host processor to said cathode ray tube device through said connector; and using said correction control data to align said video images on said cathode ray tube monitor.

2. The method of claim 1 wherein said step of using said correction control data further comprises the steps of:

storing said correction control data in monitor RAM disposed in said cathode ray tube monitor;

reading said correction control data from said monitor RAM; and applying said correction control data to correction and driver circuitry disposed within said cathode ray tube device to align said video images on said cathode ray tube monitor.

3. The method of claim 1 wherein said step of transmitting said correction control data further comprises the step of:

transmitting said correction control data over a serial connector disposed between said host computer and said cathode ray tube device.

4. The method of claim 1 wherein said steps of transmitting said correction factor data and transmitting said correction control data further comprise the step of:

transmitting said correction factor data and said correction control data over a bi-directional serial connector disposed between said host computer and said cathode ray tube device.

* * * * *